Patented Sept. 23, 1930

1,776,562

UNITED STATES PATENT OFFICE

BERNARD LONG, OF PARIS, FRANCE, ASSIGNOR TO SOCIETE ANONYME DES MANUFACTURES DES GLACES ET PRODUITS CHIMIQUES DE SAINT-GOBAIN, CHAUNY ET CIREY, OF PARIS, FRANCE

GLASS

No Drawing. Original application filed January 12, 1926, Serial No. 80,839, and in France January 10, 1927. Divided and this application filed October 13, 1927. Serial No. 226,050.

Cheaper grades of glass such as used for sheet glass, vault-lights, etc., are generally made of what are known as lime soda glasses. It has been frequently observed that these glasses, although colorless when first made, become pink or yellow when subjected to sunlight. I have discovered that this change of tint in glasses of this type is due to the action of shorter wave lengths contained in the sunlight in causing new combinations of oxygen in the glass with metallic bases found therein, such as iron, manganese and selenium, and have discovered that this can be avoided by incorporating in the glass small quantities of ingredients tending to absorb the oxygen liberated by such short wave lengths without causing coloration. To carry out my invention I propose to incorporate in a glass of the character described a small quantity of a metallic oxide having the property of absorbing oxygen without the formation of a glass coloring oxide.

Consider a well known glass such as the following:—

$SiO_2$ _____ 72%
$Na_2O$ _____ 15.5
$CaO$ _____ 12.5

This glass is liable to color changes under the conditions above stated.

Under my invention I would incorporate therein a small quantity, say two to three percent of oxide of lead, or a small quantity of titanium oxide, say one to one and one-half per cent, the titanium oxide being more energetic in its action in absorbing than the lead oxide. The substitution in question may be made by replacing a given percentage of the silica, alkali or base of the above glass with an equal percentage of the lead or titanium oxide.

This application is a division of my prior application filed January 12, 1926, Serial No. 80,839, which on May 15, 1928 issued into Patent No. 1,669,908, claiming the use of oxide of lead for the purposes herein specified.

Having thus described my invention what I claim and desire to secure by Letters Patent is:—

1. A soda lime glass having a metallic element therein which is effected by waves of short lengths and containing a substantial quantity but not over 2% of titanium oxide.

2. A soda-lime glass having a metallic element therein which is effected by waves of short length and containing not over 2% of titanium oxide, the said oxide being present in a quantity sufficient to absorb oxygen liberated in the glass and tending to cause discoloration.

In testimony whereof I hereunto affix my signature.

BERNARD LONG.